US 12,142,008 B2

(12) United States Patent
Grillo et al.

(10) Patent No.: US 12,142,008 B2
(45) Date of Patent: Nov. 12, 2024

(54) ASYMMETRIC CAMERA SENSOR POSITIONING FOR ENHANCED PACKAGE DETECTION

(71) Applicant: Google LLC, Mountain View, CA (US)

(72) Inventors: Jacobi Colton Grillo, San Jose, CA (US); Adrian Mircea Proca, Santa Cruz, CA (US); William Vincent Duran, Santa Cruz, CA (US); ChihHao Chen, Taipei (TW)

(73) Assignee: Google LLC, Mountain View, CA (US)

( * ) Notice: Subject to any disclaimer, the term of this patent is extended or adjusted under 35 U.S.C. 154(b) by 92 days.

(21) Appl. No.: 17/815,005

(22) Filed: Jul. 26, 2022

(65) Prior Publication Data
US 2023/0032321 A1    Feb. 2, 2023

Related U.S. Application Data

(63) Continuation of application No. PCT/US2021/044190, filed on Aug. 2, 2021.

(51) Int. Cl.
*G06T 7/80* (2017.01)
*G06T 7/13* (2017.01)
(Continued)

(52) U.S. Cl.
CPC ............... *G06T 7/80* (2017.01); *G06T 7/13* (2017.01); *H04N 7/186* (2013.01); *H04N 23/54* (2023.01);
(Continued)

(58) Field of Classification Search
CPC ........ H04N 23/54; H04N 23/55; H04N 23/58; H04N 23/611; H04N 23/81; H04N 7/186; G06T 7/80; G06T 7/13
See application file for complete search history.

(56) References Cited

U.S. PATENT DOCUMENTS 5,403,782 A    4/1995  Dixon et al.
8,081,468 B2  12/2011  Hill et al.
(Continued)

FOREIGN PATENT DOCUMENTS

CN    205566533    9/2016
CN    107995393    5/2018
(Continued)

OTHER PUBLICATIONS

"International Preliminary Report on Patentability", Application No. PCT/US2021/044204, Mar. 28, 2023, 12 pages.
(Continued)

*Primary Examiner* — Twyler L Haskins
*Assistant Examiner* — Akshay Trehan
(74) *Attorney, Agent, or Firm* — Colby Nipper PLLC

(57) ABSTRACT

This document describes asymmetric camera sensor positioning for enhanced package detection. In aspects, an electronic doorbell has an image sensor that is rotated to a portrait orientation and vertically shifted relative to a lens of a camera, resulting in asymmetric positioning of the image sensor relative to the lens. The lens projects an image circle onto the image sensor and the image sensor has a sensor detection area having upper corners within the image circle and lower corners outside of the image circle to enable capture of an object located in a lower portion of the image circle and proximate to an edge of the image circle. Then, lens distortion correction is performed on a captured image to provide a final image usable to detect the package, which may be located within the image circle but outside of a conventional sensor detection area.

20 Claims, 8 Drawing Sheets

(51) Int. Cl.
*H04N 7/18* (2006.01)
*H04N 23/54* (2023.01)
*H04N 23/55* (2023.01)
*H04N 23/58* (2023.01)
*H04N 23/611* (2023.01)
*H04N 23/81* (2023.01)

(52) U.S. Cl.
CPC ............ *H04N 23/55* (2023.01); *H04N 23/58* (2023.01); *H04N 23/611* (2023.01); *H04N 23/81* (2023.01)

(56) References Cited

U.S. PATENT DOCUMENTS

| | | | |
|---|---|---|---|
| 9,113,051 | B1 | 8/2015 | Scalisi |
| 9,848,517 | B2 | 12/2017 | Koeppel et al. |
| 10,042,429 | B2 | 8/2018 | Alameh et al. |
| 10,319,213 | B1 | 6/2019 | Conner |
| 10,389,983 | B1 * | 8/2019 | Fu ................... H04N 7/181 |
| 10,418,672 | B2 | 9/2019 | Tso et al. |
| 10,708,472 | B2 | 7/2020 | Jeong et al. |
| 10,718,996 | B2 | 7/2020 | Ramones et al. |
| 10,805,556 | B1 * | 10/2020 | Sorgi ................. G06V 20/52 |
| 11,277,941 | B1 | 3/2022 | Raghupathy et al. |
| 11,336,005 | B1 | 5/2022 | Chen et al. |
| 11,457,545 | B2 | 9/2022 | Heckmann et al. |
| 11,522,284 | B2 | 12/2022 | Grillo et al. |
| 11,749,885 | B2 | 9/2023 | Grillo |
| 11,839,060 | B2 | 12/2023 | Raghupathy et al. |
| 12,088,004 | B2 | 9/2024 | Grillo |
| 2004/0085205 | A1 | 5/2004 | Yeh |
| 2005/0068506 | A1 | 3/2005 | Moriwaki et al. |
| 2011/0149533 | A1 | 6/2011 | Luo et al. |
| 2011/0273569 | A1 * | 11/2011 | Douady ............... H04N 17/002 348/E17.002 |
| 2012/0091623 | A1 | 4/2012 | Wippler |
| 2014/0086441 | A1 | 3/2014 | Zhu et al. |
| 2014/0253728 | A1 | 9/2014 | Glockler |
| 2015/0036036 | A1 | 2/2015 | Gao et al. |
| 2016/0043453 | A1 | 2/2016 | Ebner et al. |
| 2016/0157333 | A1 | 6/2016 | Kim et al. |
| 2016/0189502 | A1 | 6/2016 | Johnson et al. |
| 2016/0191864 | A1 | 6/2016 | Siminoff et al. |
| 2016/0284064 | A1 * | 9/2016 | Morofuji ............. H04N 25/61 |
| 2017/0048495 | A1 | 2/2017 | Scalisi |
| 2017/0339343 | A1 | 11/2017 | Zhang et al. |
| 2018/0011390 | A1 | 1/2018 | Goulden et al. |
| 2018/0013272 | A1 | 1/2018 | Germe et al. |
| 2018/0143671 | A1 | 5/2018 | Lee et al. |
| 2018/0191930 | A1 | 7/2018 | Jeong et al. |
| 2018/0261060 | A1 | 9/2018 | Siminoff et al. |
| 2018/0288292 | A1 * | 10/2018 | Moggridge ............. H04N 23/54 |
| 2018/0343403 | A1 | 11/2018 | Mehdi et al. |
| 2019/0075648 | A1 | 3/2019 | Nasu et al. |
| 2019/0089872 | A1 | 3/2019 | Rukes et al. |
| 2019/0149775 | A1 | 5/2019 | Alamgir et al. |
| 2019/0200872 | A1 | 7/2019 | Matsuoka et al. |
| 2019/0215423 | A1 | 7/2019 | Ortiz et al. |
| 2019/0253539 | A1 | 8/2019 | Ma et al. |
| 2019/0342527 | A1 | 11/2019 | Siminoff |
| 2019/0373314 | A1 | 12/2019 | Collins et al. |
| 2019/0387204 | A1 | 12/2019 | Jeong |
| 2020/0249117 | A1 | 8/2020 | Lewander Xu et al. |
| 2020/0288045 | A1 | 9/2020 | Jeong et al. |
| 2020/0358908 | A1 | 11/2020 | Scalisi et al. |
| 2021/0127059 | A1 * | 4/2021 | Powell ................. G06T 5/80 |
| 2022/0091484 | A1 | 3/2022 | Ali et al. |
| 2022/0110228 | A1 | 4/2022 | Raghupathy et al. |
| 2022/0159877 | A1 | 5/2022 | Raghupathy et al. |
| 2022/0271422 | A1 | 8/2022 | Grillo |
| 2023/0071275 | A1 | 3/2023 | Grillo |
| 2023/0369755 | A1 | 11/2023 | Grillo |

FOREIGN PATENT DOCUMENTS

| | | |
|---|---|---|
| CN | 109887775 | 6/2019 |
| CN | 110891135 | 3/2020 |
| CN | 210271128 | 4/2020 |
| CN | 210924810 | 7/2020 |
| EP | 3445046 | 2/2019 |
| GB | 2369450 | 3/2002 |
| WO | 2017006404 A1 | 1/2017 |
| WO | 2017160906 | 9/2017 |
| WO | 2022072057 | 4/2022 |

OTHER PUBLICATIONS

"Non-Final Office Action", U.S. Appl. No. 17/649,529, filed Apr. 13, 2023, 21 pages.

"Notice of Allowance", U.S. Appl. No. 18/055,549, filed Apr. 24, 2023, 9 pages.

"Foreign Office Action", TW Application No. 112132603, Oct. 5, 2023, 9 pages.

"Foreign Office Action", AU Application No. 2021351627, Nov. 24, 2023, 3 pages.

"Notice of Allowance", U.S. Appl. No. 17/663,177, filed Aug. 9, 2022, 10 pages.

"Foreign Office Action", TW Application No. 110136748, Feb. 2, 2023, 11 pages.

"1080p Wi-Fi Video Doorbell", Retrieved at: https://www.lorextechnology.com/video-doorbell/1080p-full-hd-wi-fi-video-doorbell/LNWDB1-1-p—on May 28, 2021, 15 pages.

"An Essential Wireless Video Doorbell", Retrieved at: https://www.arlo.com/en-us/doorbell/video/arlo-essential-video-doorbell-wire-free.html—on May 28, 2021, 8 pages.

"Ex Parte Quayle Action", U.S. Appl. No. 17/061,872, filed Sep. 16, 2021, 9 pages.

"Extended European Search Report", EP Application No. 21193113.4, Feb. 4, 2022, 10 pages.

"EZViZ DB1", Retrieved at: https://www.ezvizlife.com/product/db1/960—on May 28, 2021, 9 pages.

"Foreign Office Action", TW Application No. 110136748, Jun. 2, 2022, 8 pages.

"International Search Report and Written Opinion", Application No. PCT/US2021/044204, Jan. 10, 2022, 17 pages.

"International Search Report and Written Opinion", Application No. PCT/US2021/044190, Apr. 13, 2022, 10 pages.

"International Search Report and Written Opinion", Application No. PCT/US2021/044194, Dec. 7, 2021, 12 pages.

"Invitation to Pay Additional Fees", Application No. PCT/US2021/044204, Nov. 10, 2021, 10 pages.

"Notice of Allowance", U.S. Appl. No. 17/122,449, filed Jan. 20, 2022, 9 pages.

"Notice of Allowance", U.S. Appl. No. 17/061,872, filed Dec. 13, 2021, 6 pages.

Orsan, "What's Inside?—vol. 2: Dropcam Pro", https://medium.com/@candemir/whats-inside-vol-2-dropcam-pro-f458d96ecc9a, Dec. 21, 2014, 23 pages.

Wu, et al., "Design of a Compact UWB MIMO Antenna without Decoupling Structure", Apr. 2018, 8 pages.

"Notice of Allowance", U.S. Appl. No. 17/649,529, filed Jul. 28, 2023, 9 pages.

"International Preliminary Report on Patentability", Application No. PCT/US2021/044190, Feb. 6, 2024, 7 pages.

"Non-Final Office Action", U.S. Appl. No. 18/361,453, filed Feb. 13, 2024, 11 pages.

"Notice of Allowance", U.S. Appl. No. 18/361,453, filed May 21, 2024, 9 pages.

"Foreign Office Action", JP Application No. 2023-519738, Aug. 27, 2024, 7 pages.

"Foreign Office Action", CA Application No. 3194435, Sep. 6, 2024, 5 pages.

* cited by examiner

ASYMMETRIC CAMERA SENSOR POSITIONING FOR ENHANCED PACKAGE DETECTION

RELATED APPLICATION

This application is a continuation of, and claims priority to, PCT Application Number PCT/US2021/044190, filed on Aug. 2, 2021 which is incorporated herein by reference in its entirety.

BACKGROUND

With advances in electronic doorbells for capturing images and/or videos, many users have begun to rely on their doorbell data to determine if a package has been delivered. However, many existing electronic doorbells have cameras with a limited field of view (FOV). Generally, the doorbell is oriented to enable image capture of a person's face, but not necessarily that person's feet, because the user may be more interested (for security) in seeing the person's face. In many instances, if the package is delivered too close to the doorbell (e.g., placed on the ground under the doorbell and next to the wall on which the doorbell is mounted), the package may be outside of the camera's FOV.

The user may receive a notification of a delivery and retrieve image data of a delivery driver arriving and departing, but if the user wishes to check on the status of their delivered package, the user may not be able to see the package in the doorbell data if the package is outside of the camera's FOV (e.g., if the package was placed too close to the doorbell). Further, package detection algorithms can be applied to the doorbell data, but if the package is outside the camera's FOV, the package cannot be detected in the captured images, and the user may not be notified of the package. If the package is not in the camera's FOV and a person approaches to take or steal the package, then the user may not be notified that the package has been taken.

One solution to expanding the camera's FOV is to use a doorbell camera with a 180° angle of view (AOV). However, such cameras increase manufacturing costs and may require additional architectural features to prevent infrared (IR) flare. Using such a camera may also provide additional image data (e.g., pixel data) to be displayed on the user's device that may be unimportant, including an area above the person's head. Because a finite number of pixels exist that can be displayed in an application on a screen (e.g., a smartphone's display) as the user is viewing the doorbell data, the unimportant additional image data consumes screen real estate and may result in a smaller displayed image, decreased image quality, and diminished user experience.

SUMMARY

This document describes asymmetric camera sensor positioning for enhanced package detection. In aspects, an electronic doorbell has an image sensor that is rotated to a portrait orientation and vertically shifted relative to a lens of a camera, resulting in asymmetric positioning of the image sensor relative to the lens. The lens projects an image circle onto the image sensor, and the image sensor has a sensor detection area having upper corners within the image circle and lower corners outside of the image circle to enable capture of an object located in a lower portion of the image circle and proximate to an edge of the image circle. Then, lens distortion correction is performed on a captured image to provide a final image usable to detect the package, which may be included within the image circle but outside of a conventional sensor detection area.

In some aspects, an electronic doorbell is disclosed. The electronic doorbell includes a lens having a lens optical axis and providing an image circle representing a scene captured by the lens. The image circle has an upper portion and a lower portion separated by a middle portion and arranged in a vertical stack. The upper portion is located proximate to an upper edge of the image circle and the lower portion is located proximate to a lower edge of the image circle. The electronic doorbell also includes an image sensor having a sensor detection area. The image sensor is positioned in a portrait orientation relative to the vertical stack of portions of the image circle, the portrait orientation of the sensor detection area having a vertical dimension that is greater than a horizontal dimension. Also, the image sensor is vertically shifted relative to the lens by an offset distance from the lens optical axis to enable the image sensor to capture an image of an object located in the lower portion of the image circle proximate to the lower edge of the image circle.

This summary is provided to introduce simplified concepts concerning asymmetric camera sensor positioning for enhanced package detection, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of asymmetric camera sensor positioning for enhanced package detection are described in this document with reference to the following drawings. The use of the same reference numbers in different instances in the description and the figures indicate similar elements.

DETAILED DESCRIPTION

Overview

This document describes asymmetric camera sensor positioning for enhanced package detection. The techniques described herein provide an electronic doorbell camera with a greater vertical FOV in comparison to conventional doorbell cameras. For example, the electronic doorbell camera includes an image sensor that is rotated to a portrait orientation and also vertically offset from the lens of the camera. This asymmetric positioning enables the image sensor to capture an image of an object (e.g., a package) located on the ground substantially below the electronic doorbell camera, where the object may be captured by a conventional lens but not sufficiently projected by the lens onto a conventional image sensor. Lens distortion in the captured image is then corrected in post-processing to provide a clean final image to a user, where the image may include a standing person's face as well as the package on the ground.

Not only is the vertical FOV increased, but the number of useful pixels to the user is increased, resulting in increased image quality and efficiency and an enhanced user experience. Lens distortion associated with objects near the corners of the image is reduced. Further, the overall efficiency of using a standard 160° lens is increased. While features and concepts of the described asymmetric camera sensor positioning for enhanced package detection can be implemented in any number of different environments, aspects are described in the context of the following examples.

Example Device

Figure 1:
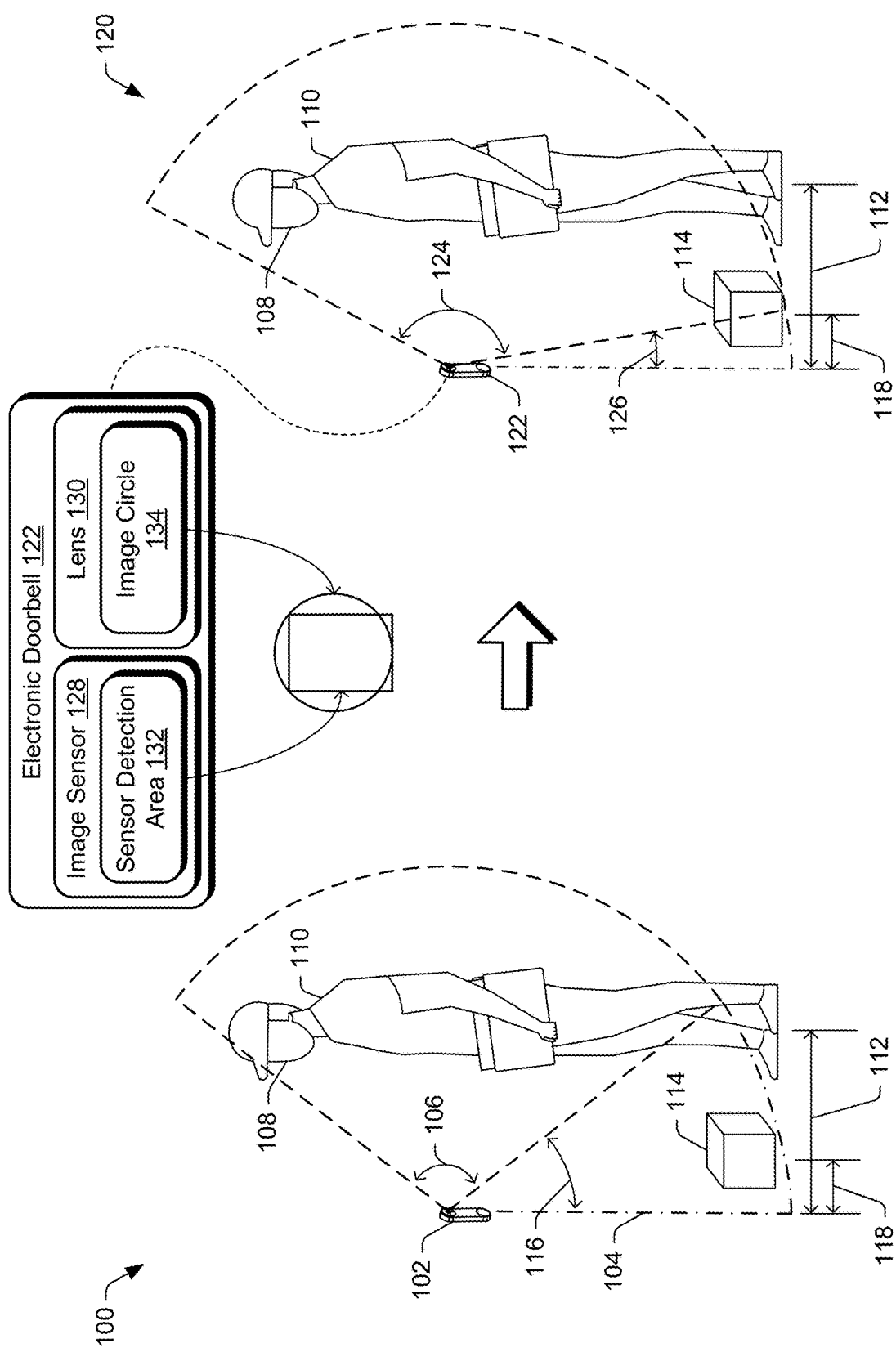
FIG. 1 illustrates an example implementation of asymmetric camera sensor positioning for enhanced package detection in comparison to a conventional camera doorbell.

FIG. 1 illustrates an example implementation of asymmetric camera sensor positioning for enhanced package detection in comparison to a conventional doorbell camera. Many conventional doorbell cameras capture images with a wide horizontal field of view (hFOV) and a short vertical field of view (vFOV), which enable image capture of people but not necessarily objects (e.g., packages) on the ground. Example 100 illustrates a conventional doorbell camera 102 mounted to a wall 104 (represented by a vertical dashed line) and having a vertical AOV 106 that is approximately 104° and oriented to capture a head and face 108 of a person 110 having a height of approximately 6 feet (ft) 2 inches (in) (1.88 meters (m)) and standing at a horizontal distance 112 of approximately 2 ft (0.6 m) from the conventional doorbell camera 102. In this example, the conventional doorbell camera 102 is unable to capture an image of a package 114 located in a region (e.g., region 116) that is substantially below the conventional doorbell camera 102 and its vertical AOV 106 (e.g., a volume between the edge of the vertical AOV 106, the conventional doorbell camera 102, the ground, and the wall 104). In the example illustration, the package 114 is located at a distance 118 of approximately 6 in (0.15 m) from the wall 104 and is "hidden" from the conventional doorbell camera 102.

Example 120 illustrates an electronic doorbell 122 with asymmetric camera sensor positioning, as described herein. The electronic doorbell 122 includes a vertical AOV 124 of approximately 130°, which provides a corresponding vFOV that enables image capture of the head and face 108 of the person 110 described above as well as the package 114 located on the ground. Using a greater vertical AOV (e.g., vertical AOV 124) reduces the size of the region 126, in comparison to the conventional vertical AOV 106, increases the corresponding vFOV for image capture, and prevents the package 114 from "hiding." To enhance the vertical AOV 124 of the electronic doorbell 122 over the vertical AOV 106 of the conventional doorbell camera 102, the electronic doorbell 122 includes a camera sensor (e.g., image sensor 128) that is oriented in a portrait orientation and asymmetrically aligned with a camera lens (e.g., lens 130) of the electronic doorbell 122, resulting in an sensor detection area 132 that is offset (e.g., not optically centered) from an image circle 134. In particular, the image sensor 128 is not optically coaxially aligned with the lens 130 but is vertically offset. In this way, the electronic doorbell 122 can achieve a greater vertical AOV (and a greater vFOV) than the conventional doorbell camera 102 by using similar components and architecture and without implementing a more expensive image sensor and/or lens. The image circle 134 is a cross section of a cone of light transmitted by the lens 130 onto the image sensor 128. The sensor detection area 132 of the image sensor 128 represents an area of light sensed by the image sensor 128. Generally, the image circle 134 is projected onto the sensor detection area 132 to enable the image sensor 128 to detect at least a portion of the image circle 134. Depending on certain factors (e.g., focal length, distance between the lens 130 and the image sensor 128, alignment, size of the image sensor 128), the sensor detection area 132 may capture some or all of the image circle 134 projected onto the image sensor 128. Further details of these and other features are described below.

Figure 2:
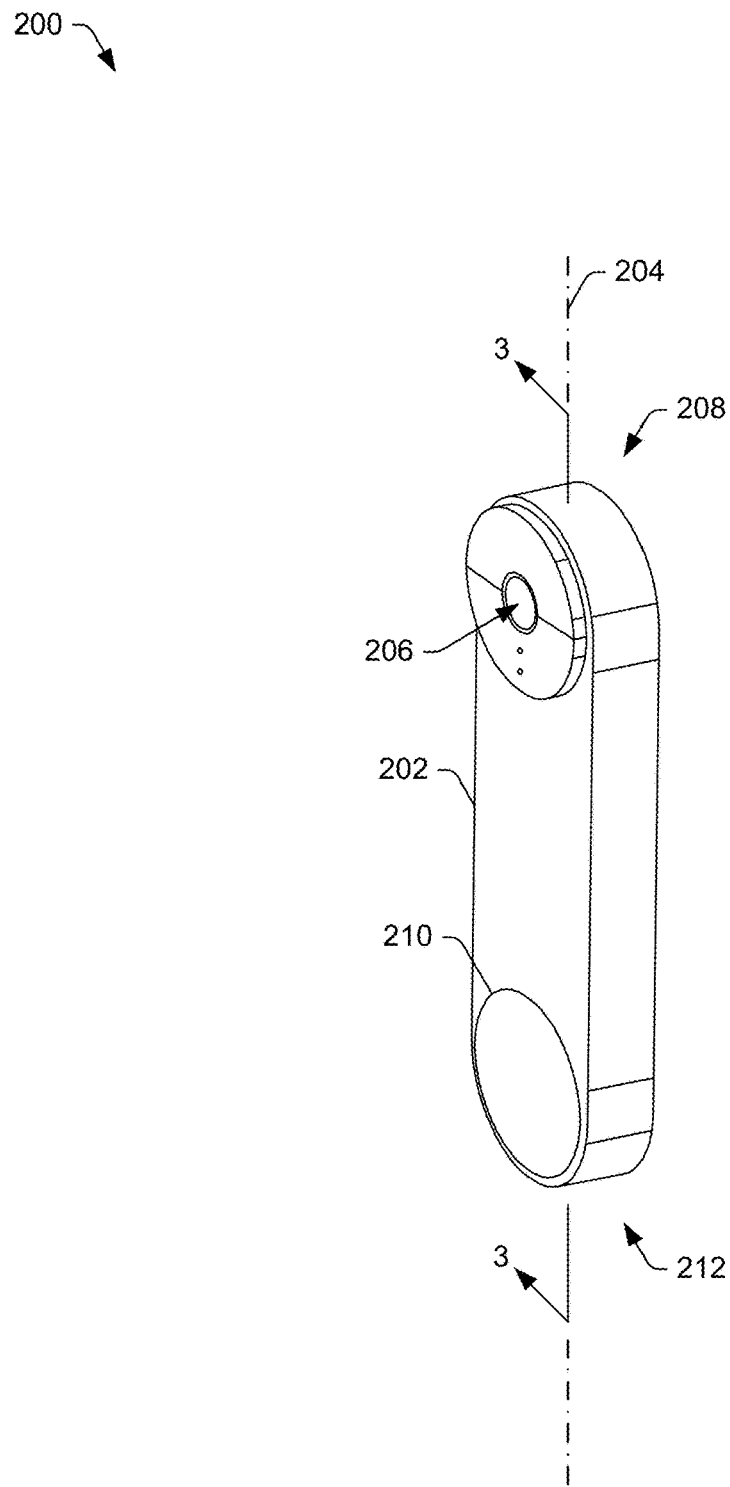
FIG. 2 illustrates an isometric view of an example implementation of the electronic doorbell from FIG. 1.

FIG. 2 illustrates an isometric view 200 of an example implementation of the electronic doorbell 122 from FIG. 1. The electronic doorbell 122 includes a housing 202 having an elongated shape (e.g., substantially obround in a front view) with opposing rounded ends intersected by a longitudinal axis 204 of the housing 202. A camera module (e.g., camera module 206 having the image sensor 128 and the lens 130 from FIG. 1) is positioned within the housing 202 proximate to a first end (e.g., camera-side end 208) of the housing 202. A pressable button 210 is positioned proximate to a second end (e.g., a button-side end 212) of the housing 202.

The housing 202 may include a plastic material and be formed, for example, using plastic-injection molding techniques. The housing 202 may include any suitable geometry, including the example geometry illustrated in FIG. 2. For instance, the housing 202 may include multiple components forming a shell (e.g., a hollow, substantially obround shell) that fit together (e.g., snap together) to form a cavity to house various components of the electronic doorbell 122. The housing 202 may also include an aperture or transparent region that is aligned with the camera module 206 to enable the camera module 206 to view through the aperture or transparent region and capture images or video of a scene.

The button 210 may include any suitable button (e.g., a mechanical button to open or close a switch, a capacitive sensor to detect user touch) usable to initiate a function. For example, actuation of the button 210 may initiate a function, including a ringing of an audible doorbell, transmission of an electronic notification to a smartphone of the doorbell's owner, initiation of the camera module 206, and so on. Any suitable function can be initiated by activating the button 210.

Figure 3:
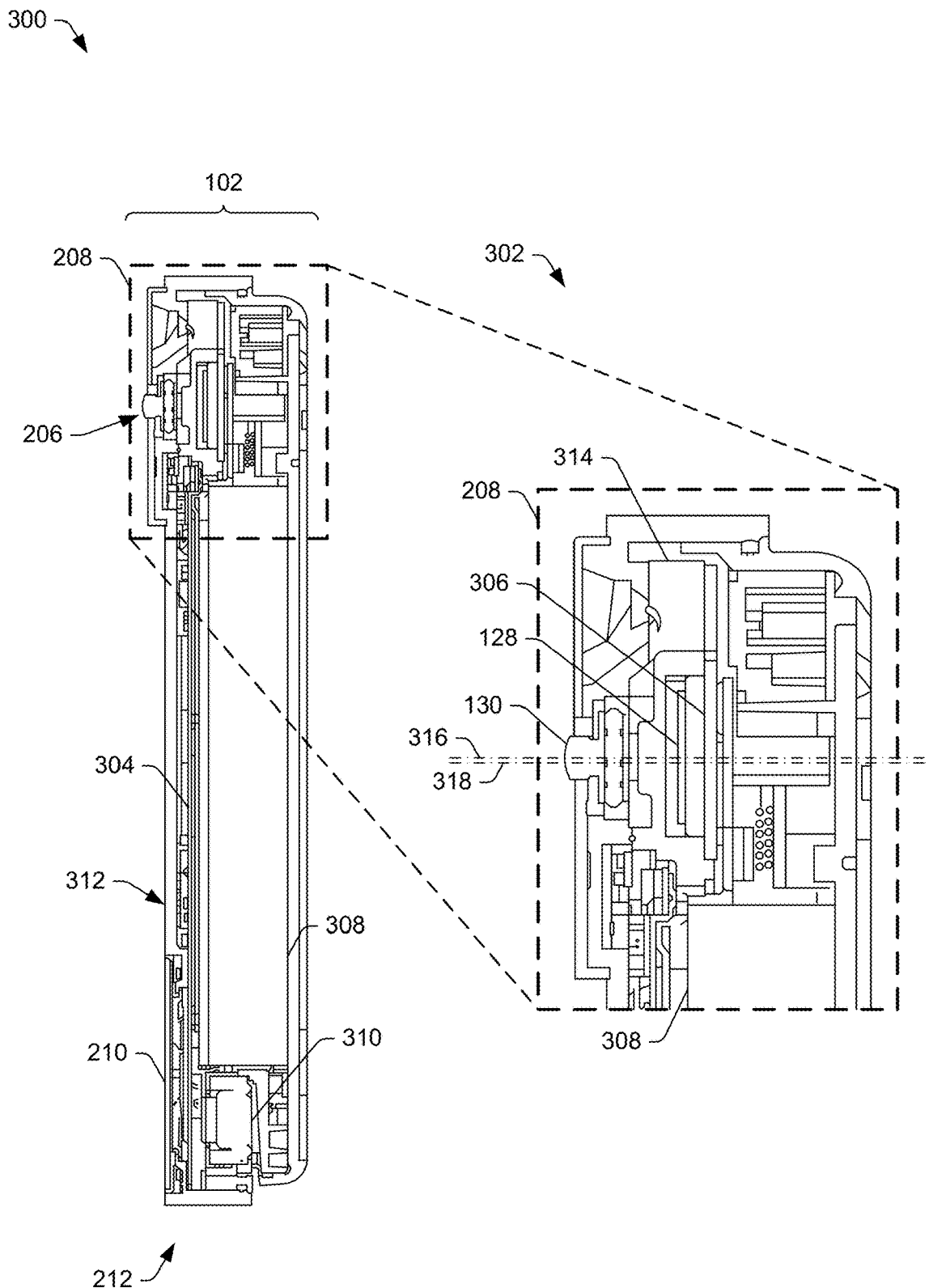
FIG. 3 illustrates a sectional view of the electronic doorbell from FIG. 2, taken along line 3-3, and an enlarged view of a camera-side end of the electronic doorbell in the sectional view.

FIG. 3 illustrates a sectional view 300 of the electronic doorbell 122 from FIG. 2, taken along line 3-3, and an enlarged view 302 of the camera-side end 208 of the electronic doorbell in the sectional view 300. Within the housing 202, the electronic doorbell 122 includes multiple printed circuit boards (PCBs), including at least a main logic board 304 and a camera board 306. Additional PCBs may also be used. The PCBs may include various integrated circuit (IC) components, including system-on-chip (SoC) IC devices, processors, and IC components for light-emitting diode(s) (LEDs), microphone(s), or sensors for detecting input such as touch-input, a button-press, a voice command, or motion. The electronic doorbell 122 also includes the camera module 206 (e.g., a camera), a battery 308, the button 210, and a speaker module 310. The battery 308 may be positioned between the camera-side end 208 and the button-side end 212.

The speaker module 310 may output audio waves toward a front and/or sides (e.g., lateral sides that are orthogonal to a front surface 312 of the housing 202) of the electronic doorbell 122. The speaker module 310 can enable a visitor (e.g., a user pressing the button 210) to listen to an audible message, including a recorded audio message or a real-time audio transmission from the doorbell's owner.

The battery 308 provides power to the electronic doorbell 122 and enables the electronic doorbell 122 to be wireless. Because the electronic doorbell 122 is battery powered, the electronic doorbell 122 can be mounted in any suitable location without having to hardwire the electronic doorbell 122 to an electric power source. For example, the electronic doorbell 122 can be mounted on a user's house proximate to their front door without having to drill holes in the house to connect wires to a power source inside the house.

The PCBs (e.g., the main logic board 304, the camera board 306) may be formed, for example, from glass-reinforced epoxy material such as FR4. In some instances, the PCBs may include a single layer of electrically conductive traces and be a single-layer board. In other instances, the PCBs may be a multi-layer board that includes multiple layers of electrically conductive traces that are separated by layers of a dielectric material.

The electronic doorbell 122 also includes a passive infrared (PIR) sensor 314 positioned within the housing 202 proximate to the camera-side end 208. The PIR sensor 314 is configured to detect motion of an object (e.g., human or animal) within an FOV of the PIR sensor 314.

The camera module 206 includes various components, including the image sensor 128 and the lens 130. In aspects, the lens 130 has an optical center (e.g., lens optical axis 316 representing a straight line passing through the geometrical center of the lens 130 and joining the centers of curvature of the lens's surfaces). The image sensor 128 also has an optical center (e.g., image-sensor optical axis 318), which in conventional camera systems is typically aligned with the lens optical axis 316 of the lens 130. However, in the electronic doorbell 122 described herein, the image-sensor optical axis 318 is vertically offset from the lens optical axis 316. Further details are described in relation to FIG. 4.

Figure 4:
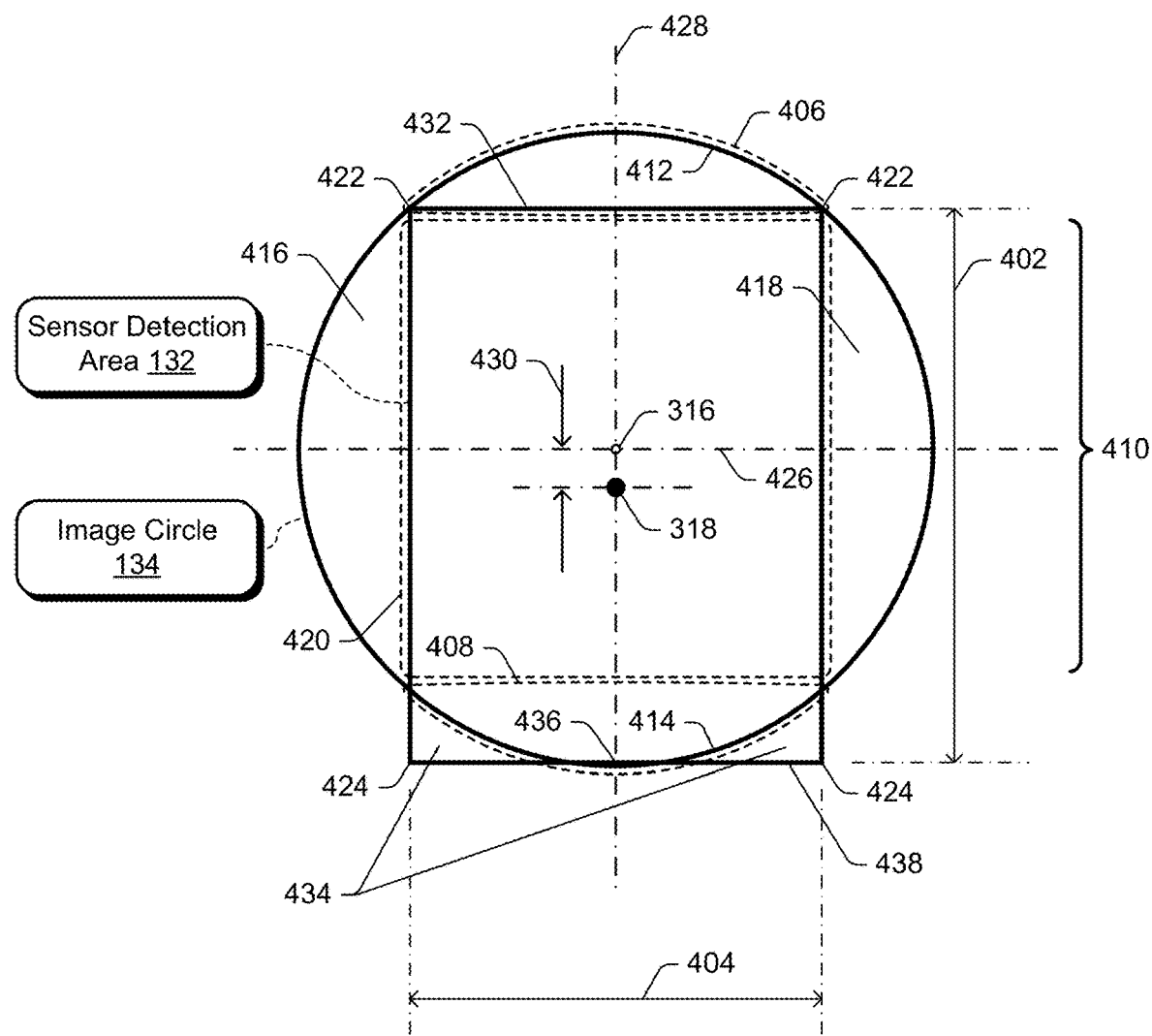
FIG. 4 illustrates an example implementation of the sensor detection area in relation to the image circle based on asymmetric positioning of the image sensor relative to the lens.

FIG. 4 illustrates an example implementation 400 of the sensor detection area 132 in relation to the image circle 134 based on asymmetric positioning of the image sensor 128 relative to the lens 130 (shown in FIG. 1). In aspects, the image sensor 128 is shifted relative to the lens 130 in order to shift the sensor detection area 132 relative to the image circle 134. In addition, the image sensor 128 is rotated 90 degrees to cause the sensor detection area 132 to have a portrait orientation (e.g., a 3:4 portrait orientation). This portrait orientation provides a vertical dimension (e.g., height 402) that is greater than a horizontal dimension (e.g., width 404) for the image sensor 128. By implementing both the portrait orientation and the shift of the image sensor 128, the vertical AOV (and the corresponding vFOV) is increased (e.g., see example 120 in FIG. 1 showing the vertical AOV 124 of approximately 130°). Accordingly, the height 402 of the image sensor 128 enables the image sensor 128 to capture an area of the image circle 134 corresponding to a vertical AOV of the lens 130 of approximately 130°.

The image circle 134 may include multiple portions, including an upper portion 406 and a lower portion 408 separated by a middle portion 410 and arranged in a vertical stack. The upper portion is located proximate to an upper edge 412 of the image circle. The lower portion is located proximate to a lower edge 414 of the image circle. In some examples, the middle portion may be further divided into a left portion 416 and a right portion 418 separated by a center portion 420 and arranged in a horizontal stack. It is noted that the terms "upper" and "lower" are described relative to the illustrated examples and are not intended to be limited with respect to a particular orientation of components relative to external factors (e.g., Earth, gravity). The described techniques may also be implemented by switching the terms "upper" and "lower" herein and applying the techniques in a lens arrangement with mirror-inversion, in which a projected image of the scene is inverted when detected by the image sensor 128.

In aspects, the image circle 134 may be associated with the lens 130 having an AOV range of approximately 160° (referred to as a 160° lens) which may be substantially less expensive than a 180° lens. In conventional camera systems that use a 160° lens, the sensor detection area 132 (e.g., having a rectangular shape) may not capture upper and lower portions (e.g., the upper portion 406 and the lower portion 408, respectively) of the image captured in the image circle 134 (e.g., having an elliptical shape) if all of the corners of the sensor detection area 132 are located within the image circle 134.

In the illustrated example, however, the upper two corners (e.g., upper corners 422) of the sensor detection area 132 are located inside the elliptical shape (e.g., circular shape) of the image circle 134, and the lower two corners (e.g., lower corners 424) are located outside the boundary of the image circle 134. The image-sensor optical axis 318 is horizontally aligned (e.g., aligned along a horizontal axis 426) with the lens optical axis 316 but is vertically shifted (e.g., along a vertical axis 428) so as to be vertically asymmetric with the lens optical axis 316. In an example using a mirror-inversion lens arrangement, the lower corners 424 may be located inside the image circle 134 while the upper corners 422 are located outside the image circle 134.

This image-sensor optical axis 318 may be shifted relative to the lens optical axis 316 by any suitable distance (e.g., offset distance 430), which enables the image sensor 128 to capture the lower portion 408 of the image circle 134 that is proximate to a boundary (e.g., an edge) of the image circle 134. In an example, the offset distance 430 may be substantially within a range of 0.15 millimeters (mm) to 0.35 mm In aspects, the upper portion 406 (e.g., area between the upper edge 412 of the image circle 134 and a top edge 432 of the sensor detection area 132) may not include useful pixels because it generally includes an area above the person's head with uninteresting or unimportant image data. Accordingly, locating the upper corners 422 of the sensor detection area 132 within the image circle prevents the upper two corner areas of a captured image from having black pixels. The lower portion 408, however, may include useful pixels because it may include the package 114 (shown in FIG. 1) located on the ground in proximity to the wall upon which the electronic doorbell 122 is mounted. Therefore, locating the lower corners 424 outside of the image circle 134 enables capture of the lower portion 408.

Because a portion of the sensor detection area 132 is beyond the lower edge 414 of the image circle 134 projected onto the image sensor 128, the sensor detection area 132 may include two lower corner areas 434 that result in black pixels (e.g., vignetting) in corresponding bottom corner areas of a captured image. Consequently, the bottom corner areas of an image captured by the image sensor 128 become black but can be corrected using distortion correction techniques. Shifting the image sensor 128, however, reduces distortion and image artifacts that may be introduced by distortion correction techniques applied to the image, in particular with objects near the corners of the image. In aspects, the center (e.g., midpoint 436) of the bottom edge (e.g., bottom edge 438 between the corners (e.g., lower corners 424) that are outside of the image circle 134) of the sensor detection area 132 is positioned within the image circle 134, rather than being tangent to the edge of the image circle 134 or outside of the image circle 134. This positioning of the bottom edge 438 of the sensor detection area 132 relative to the image circle 134 reduces the number of black pixels included near the bottom of the captured image and improves the efficiency of the lens distortion correction techniques described herein. In another example, however, the center of the bottom edge 438 of the sensor detection area 132 may be tangent to the edge (e.g., lower edge 414) of the image circle 134. In yet another example, the midpoint 436 of the bottom edge 438 of the sensor detection area 132 may be located beyond the lower edge 414 of the image circle 134 but may result in additional black pixels that necessitate some additional post-processing procedures for their removal.

Additionally, shifting the sensor detection area 132 relative to the image circle 134 increases the quality of the image by increasing (e.g., maximizing) the number of useful pixels for the user. For example, capturing the upper portion 406 and subsequently cropping the corresponding data reduces image quality because pixels are being "thrown away." By capturing a finite number of pixels, removing a portion (e.g., the upper portion 406), and then enlarging the resultant image for display on a user's screen, the remaining portion of the image may become blurry or pixilated. Accordingly, by shifting the sensor detection area 132, the image sensor 128 is capturing those parts of the image that have useful image data and/or are important to the user (e.g., a greater vFOV to capture a person's face as well as a package located on the ground under the electronic doorbell 122). Consequently, shifting the image sensor 128 and performing post-processing on the captured image, as described herein, not only increases the vFOV for capturing an image but also reduces (e g, minimizes) the number of pixels used for the end result, which increases (e.g., maximizes) image quality.

Figure 5:
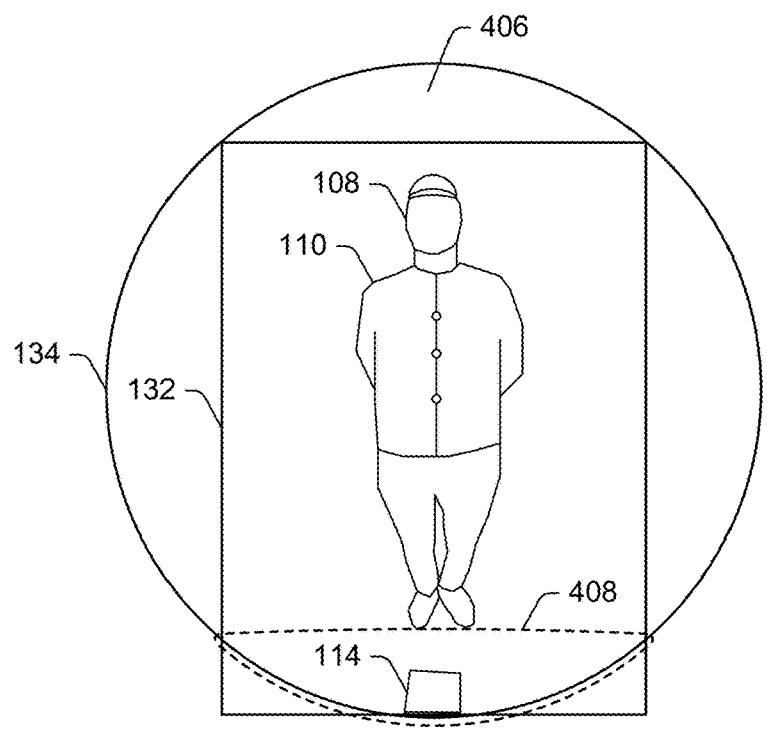
FIG. 5 illustrates an example implementation of the sensor detection area shifted relative to the image circle for enhanced package detection.

FIG. 5 illustrates an example implementation 500 of the sensor detection area shifted relative to the image circle for enhanced package detection. In the illustrated example, the image circle 134 is shown substantially as an ellipse (e.g., circle). However, the image circle 134 may be any suitable shape, which is based on a shape and curvature of the lens 130. The sensor detection area 132 captures a portion of the image circle 134 projected onto the image sensor 128. In the illustrated example, the image circle 134 includes an image of a person (e.g., the person 110) standing in front of the electronic doorbell 122. A package (e.g., the package 114) is shown in the lower portion 408 of the image circle 134. The upper portion 406 of the image circle 134 captures a space above the head and face 108 of the person 110 in the image and does not include any data associated with the person 110. After the image sensor 128 captures a portion of the image that is bounded within the sensor detection area 132, distortion correction may be performed on the captured image, an example of which is described with respect to FIG. 6.

Figure 6:
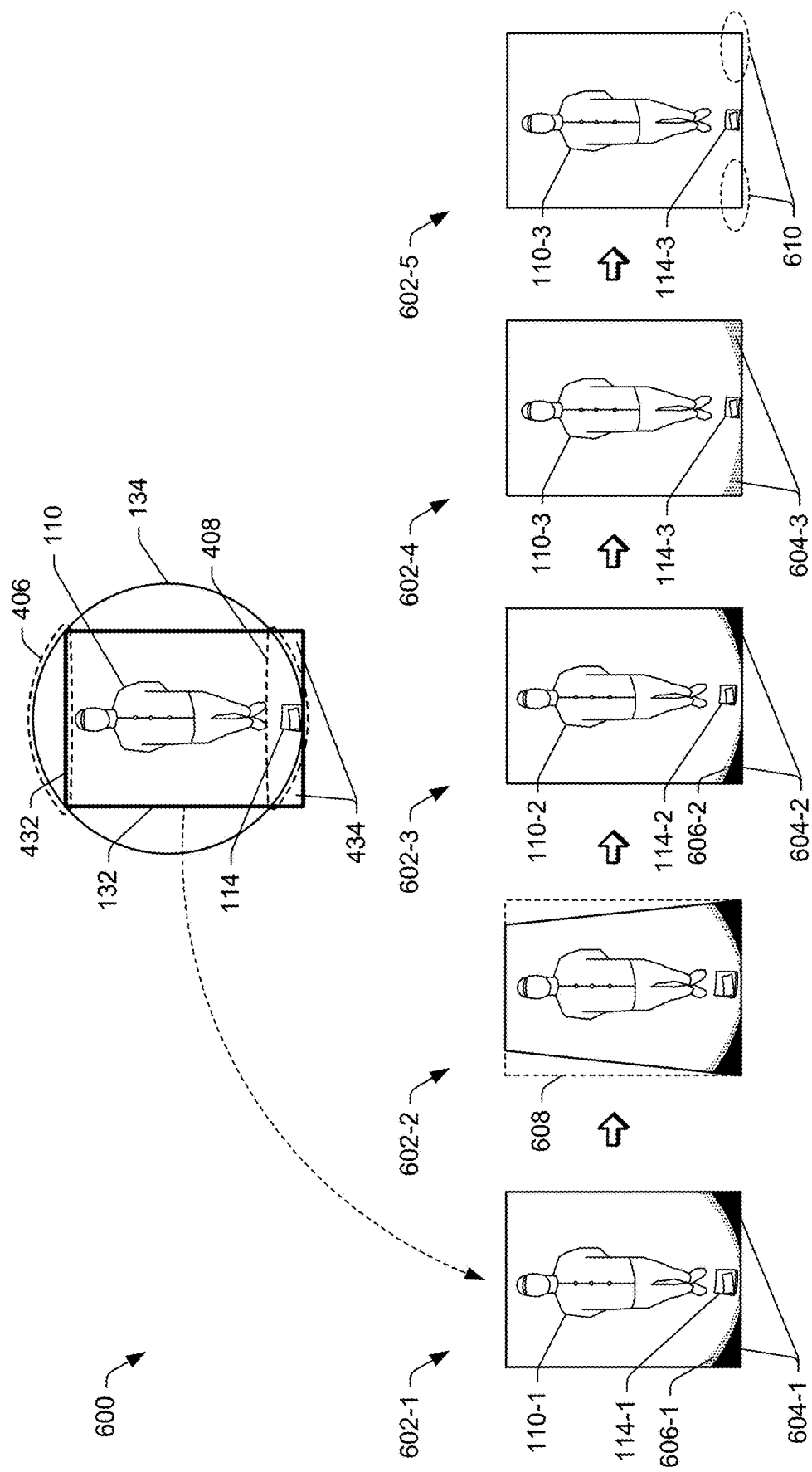
FIG. 6 illustrates an example implementation of lens distortion correction in accordance with asymmetric camera sensor positioning in an electronic doorbell.

FIG. 6 illustrates an example implementation 600 of lens distortion correction in accordance with asymmetric camera sensor positioning in an electronic doorbell. First, the image sensor 128 (from FIG. 1 and shifted relative to the lens 130) captures an image (e.g., image 602-1) including a portion of the image circle 134 and a portion (e.g., two lower corner areas 434) outside of the image circle 134 near the bottom of the sensor detection area 132. As illustrated, the captured image 602-1 includes the lower portion 408 of the image circle 134 and black corner areas 604-1 corresponding to the two lower corner areas 434 of the sensor detection area 132. The captured image 602-1, however, does not include the upper portion 406 of the image circle 134 above the top edge 432 of the sensor detection area 132. The captured image 602-1 also includes the package 114-1. In some aspects, the captured image 602-1 may also include dark pixels (e.g., regions 606-1) or other artifacts near the edge of the image circle 134, which is proximate to the black corner areas 604-1.

A keystone correction 608 is applied to the captured image 602-1 to provide a keystoned image 602-2 for asymmetric correction. Because the captured image 602-1 includes vertical asymmetry due to the asymmetric positioning of the image sensor 128 relative to the lens 130, the keystone correction 608 is applied to remove some of the lens distortion.

The keystoned image 602-2 is straightened to provide a straightened image 602-3, which corrects some of the lens distortion (e.g., vertical asymmetry) in the original captured image 602-1. Notice the person 110-2 in the straightened image 602-3 is thinner (e.g., less distorted) than the person 110-1 in the original captured image 602-1. Additionally, the black corner areas 604-1 have decreased in size to black corner areas 604-2. The regions 606-1 have also decreased in size to regions 606-2. In some aspects, the package 114-1 may be altered due to the straightening of the keystoned image 602-2. For example, the package 114-2 in the straightened image 602-3 is smaller than the package 114-1 in the original captured image 602-1. However, the package 114-2 is sufficient in size to be identifiable as a package on the user's doorstep. In aspects, the keystone correction 608 includes applying a trapezoidal shape to the image, which is narrower at the top of the image and wider at the bottom of the image. The keystone correction reduces the risk of introducing artifacts towards the top of the image during subsequent dewarping of the image.

The edges of the straightened image 602-3 are dewarped to provide a dewarped image 602-4. Dewarping the edges of the straightened image 602-3 removes the black corner areas 604-2 from the bottom of the image. In aspects, the dewarping may cause some distortion to the package 114-3, but the lens distortion of the person 110-3 is significantly reduced. Further, some distortion may be acceptable because fully correcting the distortion may introduce artifacts into the image, which degrades the final image and diminishes the user experience. In an example, the dewarped image 602-4 may include the regions 606-3 of darkened pixels that were proximate to the edge of the image circle 134.

The dewarped image 602-4 may be brightened to remove the darkened pixels in the regions 606-3 and provide a final image 602-5. The final image 602-5 includes a distortion-corrected image that includes the person 110-3 (including the person's head and face) and the package 114-3 with no black or darkened pixels in the bottom corners (e.g., bottom corner areas 610) of the final image 602-5. The final image 602-5 may then be provided to the user's device (e.g., smartphone) for display.

Example Methods

Figure 7:
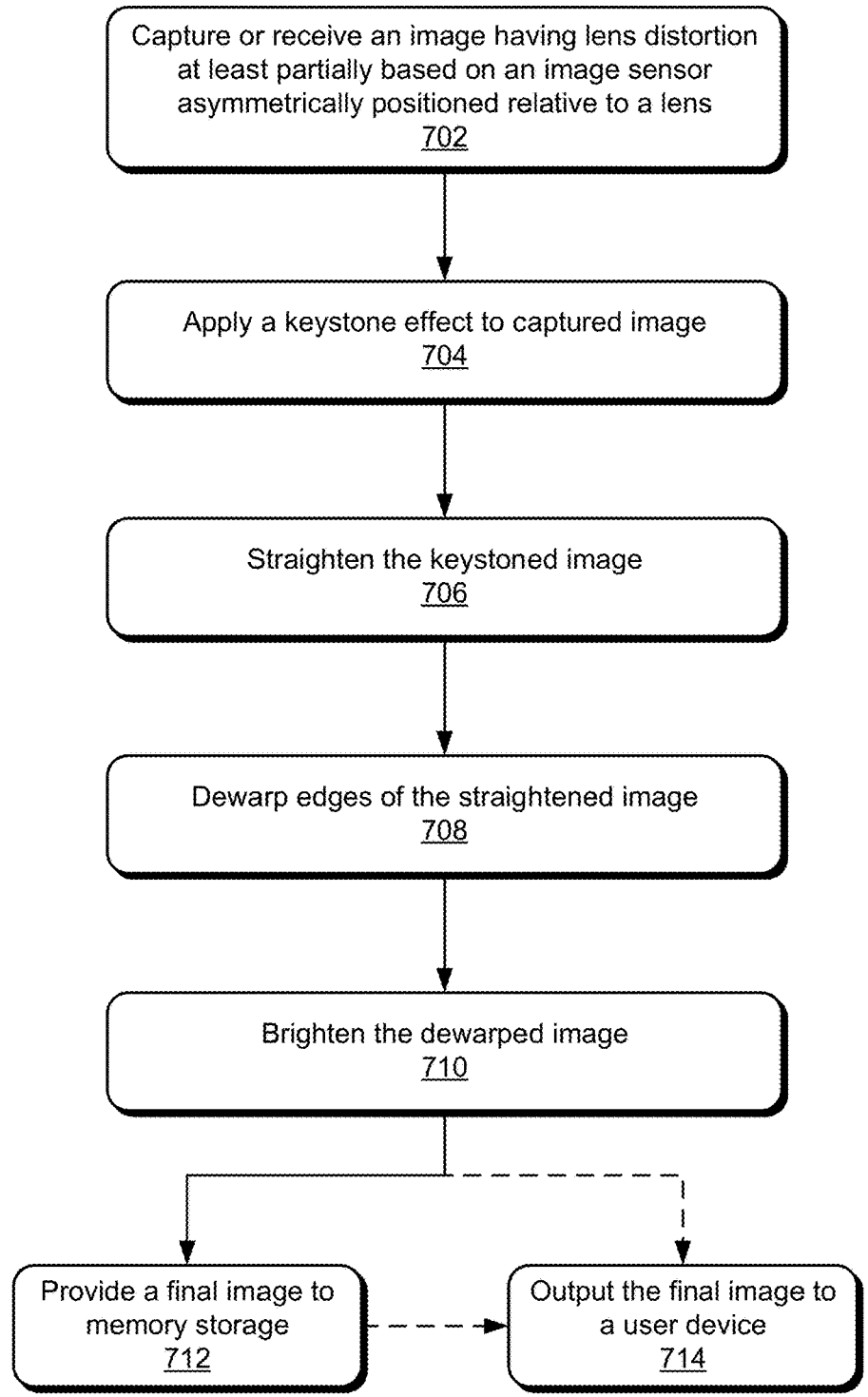
FIG. 7 depicts an example method for correcting lens distortion of an image captured by an asymmetrically positioned camera sensor, in accordance with the techniques described herein.

FIG. 7 depicts an example method 700 for correcting lens distortion caused by an electronic doorbell with asymmetric image sensor positioning, in accordance with the techniques described herein. In aspects, the method 700 may be performed by one or more processors of the electronic doorbell 122.

At 702, an image is captured or received having lens distortion at least partially based on an image sensor asymmetrically positioned relative to a lens. In aspects, the image sensor 128 is asymmetrically positioned relative to the lens 130, resulting in a vertical offset of the image-sensor optical axis 318 (e.g., optical center of the image sensor 128) from the lens optical axis 316 (e.g., optical center of the lens 130). Further, the image sensor 128 is oriented in a portrait orientation. As a result of the orientation and asymmetric positioning of the image sensor 128 relative to the lens 130, the sensor detection area 132 is vertically offset from a center of the image circle 134 to include a lower portion (e.g., the lower portion 408) of the image circle 134 and regions (e.g., the lower corner areas 434) beyond the boundary of image circle 134, which result in the captured image having black corner areas 604-1.

At 704, a keystone correction is applied to the captured image to provide a keystoned image. For example, the keystone correction 608 may be applied to the captured image 602-1 to provide the keystoned image 602-2 usable to correct vertical asymmetry resulting from the asymmetric positioning of the image sensor 128 relative to the lens 130.

At 706, the keystoned image is straightened to provide a straightened image. For example, the keystoned image 602-2 may be straightened to correct the vertical asymmetry and provide the straightened image 602-3. In an example, the straightening of the keystoned image 602-2 essentially stretches the keystoned image 602-2 more at the top than at the bottom of the image.

At 708, the straightened image is dewarped to provide a dewarped image. For example, the edges of the straightened image 602-3 are dewarped to provide the dewarped image 602-4. The dewarping removes black areas (e.g., the black corner areas 604) corresponding to the two lower corner areas 434 of the sensor detection area 132.

At 710, the dewarped image is brightened to provide a final image. For example, the dewarped image 602-4 is brightened to provide the final image 602-5, which has the lens distortion corrected and no black corners.

At 712, the final image is provided to computer-readable storage memory. For example, the final image 602-5 may be stored in local storage or in remote storage (e.g., online storage). Because the electronic doorbell 122 is battery powered, the final image 602-5 may be wirelessly communicated to a remote data storage.

At 714, the final image is output to a user device (e.g., smartphone). In an example, the final image 602-5 may be provided to the user device based on a request for access to the local storage or the remote storage. Optionally, the final image can be output to the user device at 714 prior to, or simultaneously with, providing the final image to memory storage at 712. Accordingly, the techniques described herein include keystone dewarping of a 3:4 portrait-configured image sensor to provide a final image 602-5 having an enhanced vFOV with no black corners. These techniques enable enhanced package detection of a package or other object located in the lower portion 408 of the image circle 134, which may typically be outside of a conventional image sensor's FOV. Accordingly, such a package may be detected based on the final image 602-5, and a notification can be provided to a user of another electronic device associated with the electronic doorbell 122 to notify the user that the package is present or, in some instances, that the package has been removed.

Example Computing System

Figure 8:
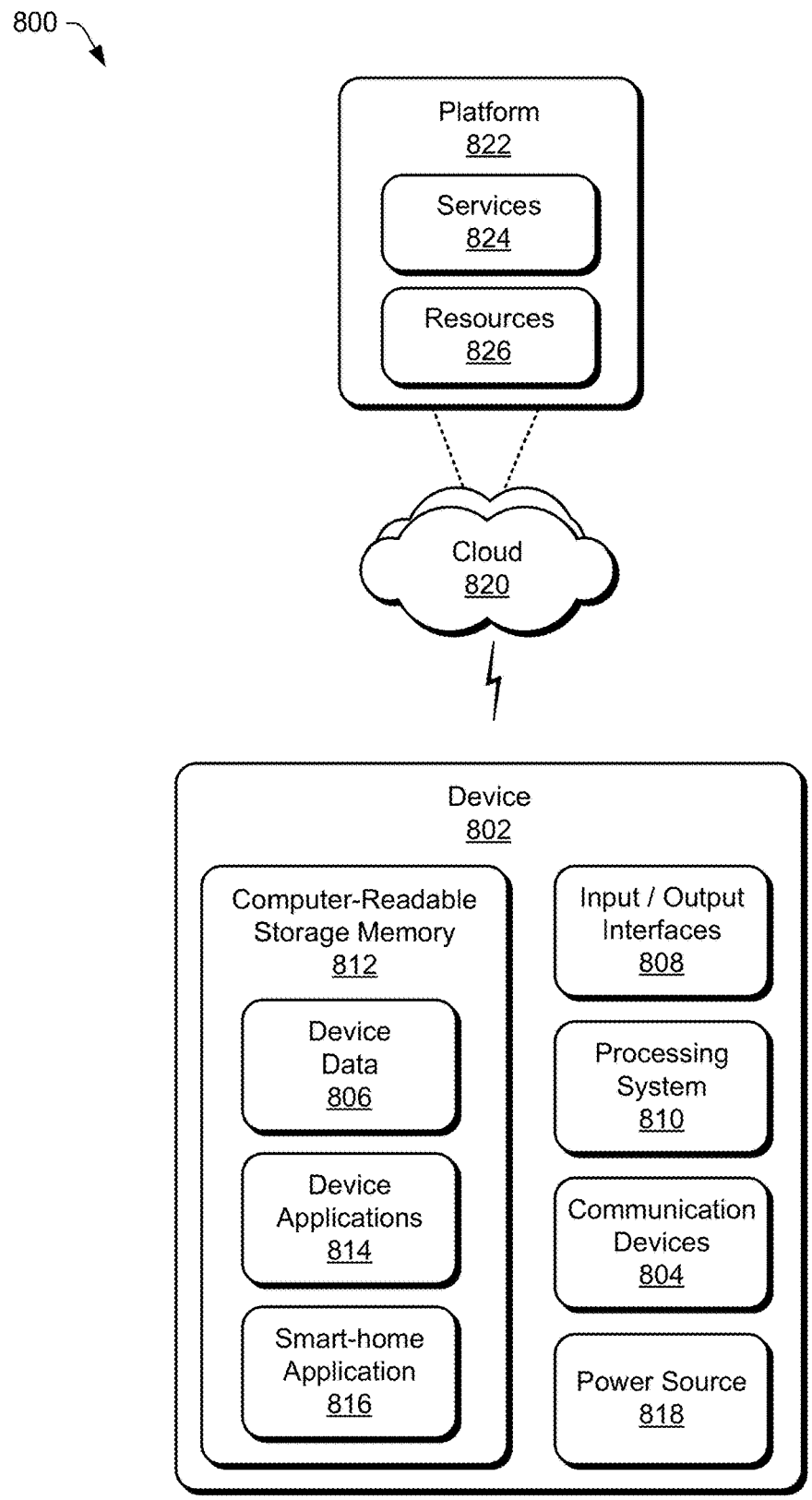
FIG. 8 is a block diagram illustrating an example system that includes an example device, which can be implemented as any electronic device (e.g., the electronic doorbell) that implements aspects of asymmetric camera sensor positioning as described with reference to FIGS. 1-7.

FIG. 8 is a block diagram illustrating an example system 800 that includes an example device 802, which can be implemented as any electronic device (e.g., the electronic doorbell 122) that implements aspects of asymmetric camera sensor positioning as described with reference to FIGS. 1-7. The example device 802 may be any type of computing device, client device, mobile phone, tablet, communication, entertainment, gaming, media playback, and/or other type of device. Further, the example device 802 may be implemented as any other type of electronic device that is configured for communication on a network, such as a thermostat, doorbell, hazard detector, camera, light unit, commissioning device, router, border router, joiner router, joining device, end device, leader, access point, a hub, and/or other electronic devices. The example device 802 can be integrated with electronic circuitry, microprocessors, memory, input-output (I/O) logic control, communication interfaces and components, as well as other hardware, firmware, and/or software to communicate via the network. Further, the device 802 can be implemented with various components, such as with any number and combination of different components, as further described below.

The device 802 includes communication devices 804 that enable wired and/or wireless communication of device data 806, such as data that is communicated between the devices in a network, data that is being received, data scheduled for broadcast, data packets of the data, data that is synchronized between the devices, etc. The device data can include any type of communication data, as well as audio, video, and/or image data that is generated by applications executing on the device. The communication devices 804 can also include transceivers for cellular phone communication and/or for network data communication. The communication devices 804 can include wireless radio systems for multiple, different wireless communications systems. The wireless radio systems may include Wi-Fi, Bluetooth™, Mobile Broadband, Bluetooth Low Energy (BLE), and/or point-to-point IEEE 802.15.4. Each of the different radio systems can include a radio device, antenna, and chipset that is implemented for a particular wireless communications technology.

The device 802 also includes input/output (I/O) interfaces 808, such as data network interfaces that provide connection and/or communication links between the device, data networks (e.g., an internal network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, such as audio, video, and/or image data received from any content and/or data source.

The device 802 includes a processing system 810 that may be implemented at least partially in hardware, such as with any type of microprocessors, controllers, or the like that process executable instructions. The processing system can include components of an integrated circuit, a programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 802 may further include any type of a system bus or other data and command transfer system that couples the various components within the device. A system bus can include any one or combination of different bus structures and architectures, as well as control and data lines.

The device 802 also includes computer-readable storage memory 812, such as data storage devices that can be accessed by a computing device, and that provide persistent storage of data and executable instructions (e.g., software applications, modules, programs, functions, or the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 812 provides storage of the device data 806 and various device applications 814, such as an operating system that is maintained as a software application with the computer-readable storage memory and executed by the processing system 810. The device applications may also include a device manager, such as any form of a control application, software application, signal processing and control module, code that is native to a particular device, a hardware abstraction layer for a particular device, and so on. In this example, the device applications also include a smart-home application 816 that implements aspects of the asymmetric camera sensor positioning for enhanced package detection, such as when the example device 802 is implemented as any of the electronic devices described herein. The device 802 also includes a power source 818, such as the battery 308. An alternating current (AC) power source may also be used to charge the battery of the device.

In aspects, at least part of the techniques described for the electronic doorbell 122 may be implemented in a distributed system, such as over a "cloud" 820 in a platform 822. The cloud 820 includes and/or is representative of the platform 822 for services 824 and/or resources 826.

The platform 822 abstracts underlying functionality of hardware, such as server devices (e.g., included in the services 824) and/or software resources (e.g., included as the resources 826), and communicatively connects the example device 802 with other devices, servers, etc. The resources 826 may also include applications and/or data that can be utilized while computer processing is executed on servers that are remote from the example device 802. Additionally, the services 824 and/or the resources 826 may facilitate subscriber network services, such as over the Internet, a cellular network, or Wi-Fi network. The platform 822 may also serve to abstract and scale resources to service a demand for the resources 826 that are implemented via the platform, such as in an interconnected device implementation with functionality distributed throughout the system 800. For example, the functionality may be implemented in part at the example device 802 as well as via the platform 822 that abstracts the functionality of the cloud 820.

Some examples are described below:

An electronic doorbell comprising: a lens having a lens optical axis and providing an image circle representing a scene captured by the lens, the image circle having an upper portion and a lower portion separated by a middle portion and arranged in a vertical stack, the upper portion located proximate to an upper edge of the image circle, the lower portion located proximate to a lower edge of the image circle; and an image sensor having an sensor detection area, the image sensor being: positioned in a portrait orientation relative to the vertical stack of portions of the image circle, the portrait orientation of the sensor detection area having a vertical FOV that is greater than a horizontal FOV; and vertically shifted relative to the lens toward the lower portion of the image circle by an offset distance from the lens optical axis to enable the image sensor to capture an image of an object located in the lower portion of the image circle proximate to the lower edge of the image circle.

The image sensor may be configured in a 3:4 portrait orientation.

The sensor detection area may have a rectangular shape and the image circle may have an elliptical shape; and the sensor detection area may include two upper corners located within the image circle and two lower corners located outside of the image circle.

The image sensor may have an image sensor optical axis; and the image sensor may be vertically shifted relative to the lens to have the image sensor optical axis offset from the lens optical axis by the offset distance along a vertical axis of the lens.

The image sensor optical axis may be parallel to the lens optical axis.

The offset distance may be substantially within a range of 0.15 millimeters to 0.35 millimeters.

The image circle represents the scene based on the lens having an angle of view of approximately 160°.

The portrait orientation and the vertical shift of the image sensor relative to the lens may enable the image sensor to capture an area of the image circle corresponding to a vertical angle of view of the lens of approximately 130°.

The electronic doorbell may further comprise a processor configured to perform lens distortion correction on an image captured by the image sensor to remove black areas in lower corner areas of the captured image.

The processor may be configured to perform lens distortion correction by: applying a keystone correction to the captured image to provide a keystoned image usable to correct vertical asymmetry; and straightening the keystoned image to correct the vertical asymmetry and provide a straightened image.

The processor may be configured to perform the lens distortion correction by further dewarping the straightened image to remove the black areas in the lower corner areas and provide a dewarped image.

The processor may be configured to perform the lens distortion correction by further brightening the dewarped image to provide a final image for display.

The image sensor may be positioned to have a midpoint of a bottom edge of the sensor detection area located within the image circle.

A method for correcting lens distortion caused by an electronic doorbell with asymmetric image sensor positioning, the method comprising: capturing an image using an image sensor of the electronic doorbell having: a sensor detection area oriented in a portrait orientation; and an image-sensor optical axis vertically shifted from a lens optical axis of a lens of the electronic doorbell, the sensor detection area having upper corners located within an image circle projected onto the image sensor by the lens and lower corners located outside of the image circle; applying a keystone correction to the captured image to provide a keystoned image usable to correct vertical asymmetry resulting from the vertically shifted image-sensor optical axis; straightening the keystoned image to correct the vertical asymmetry and provide a straightened image; dewarping the straightened image to remove black areas corresponding to the lower corners of the sensor detection area and provide a dewarped image; brightening the dewarped image to provide a final image for display on an electronic device.

The method may further comprise: detecting a package located in a lower portion of the image circle proximate to an edge of the image circle based on the final image; and providing an indication to a user of the electronic device that the package is present.

CONCLUSION

Although aspects of the asymmetric camera sensor positioning for enhanced package detection have been described in language specific to features and/or methods, the subject of the appended claims is not necessarily limited to the specific features or methods described. Rather, the specific features and methods are disclosed as example implementations of the claimed asymmetric camera sensor positioning for enhanced package detection, and other equivalent features and methods are intended to be within the scope of the appended claims. Further, various different aspects are described, and it is to be appreciated that each described aspect can be implemented independently or in connection with one or more other described aspects.

What is claimed is:

1. An electronic doorbell comprising:
a lens having a lens optical axis and providing an image circle representing a scene captured by the lens, the image circle having an upper portion and a lower portion separated by a middle portion and arranged in a vertical stack, the upper portion located proximate to an upper edge of the image circle, the lower portion located proximate to a lower edge of the image circle;
an image sensor having a sensor detection area, the image sensor being:
positioned in a portrait orientation relative to the vertical stack of portions of the image circle, the portrait orientation of the image sensor causing the sensor detection area to have a vertical dimension that is greater than a horizontal dimension; and
vertically shifted relative to the lens toward the lower portion of the image circle by an offset distance from the lens optical axis to enable the image sensor to capture an image of an object located in the lower portion of the image circle proximate to the lower edge of the image circle, the sensor detection area having a rectangular shape and including two upper corners located within the image circle and two lower corners located outside of the image circle; and
a processor configured to perform lens distortion correction on an image captured by the image sensor, the lens distortion correction including removal of black areas in lower corner areas of the captured image corresponding to the two lower corners of the sensor detection area that are outside of the image circle.

2. The electronic doorbell of claim 1, wherein the image sensor is configured in a 3:4 portrait orientation.

3. The electronic doorbell of claim 1, wherein:
the image sensor has an image sensor optical axis; and
the image sensor is vertically shifted relative to the lens to have the image sensor optical axis offset from the lens optical axis by the offset distance along a vertical axis of the lens.

4. The electronic doorbell of claim 3, wherein the image sensor optical axis is parallel to the lens optical axis.

5. The electronic doorbell of claim 1, wherein the offset distance is substantially within a range of 0.15 millimeters to 0.35 millimeters.

6. The electronic doorbell of claim 1, wherein the image circle represents the scene based on the lens having an angle of view of approximately 160°.

7. The electronic doorbell of claim 1, wherein the portrait orientation and the vertical shift of the image sensor relative to the lens enables the image sensor to capture an area of the image circle corresponding to a vertical angle of view of the lens of approximately 130°.

8. The electronic doorbell of claim 1, wherein the processor is configured to perform lens distortion correction by:
applying a keystone correction to the captured image to provide a keystoned image usable to correct vertical asymmetry; and
straightening the keystoned image to correct the vertical asymmetry and provide a straightened image.

9. The electronic doorbell of claim 8, wherein the processor is configured to perform the lens distortion correction by further dewarping the straightened image to remove the black areas in the lower corner areas and provide a dewarped image.

10. The electronic doorbell of claim 9, wherein the processor is configured to perform the lens distortion correction by further brightening the dewarped image to provide a final image for display.

11. The electronic doorbell of claim 1, wherein the image sensor is positioned to have a midpoint of a bottom edge of the sensor detection area located within the image circle.

12. A method comprising:
capturing an image using an image sensor of an electronic doorbell having:
a sensor detection area oriented in a portrait orientation; and
an image-sensor optical axis vertically shifted from a lens optical axis of a lens of the electronic doorbell, the sensor detection area having upper corners located within an image circle projected onto the image sensor by the lens and lower corners located outside of the image circle;
applying a keystone correction to the captured image to provide a keystoned image usable to correct vertical asymmetry resulting from the vertically shifted image-sensor optical axis;
straightening the keystoned image to correct the vertical asymmetry and provide a straightened image;

dewarping the straightened image to remove black areas corresponding to the lower corners of the sensor detection area and provide a dewarped image; and brightening the dewarped image to provide a final image for display on an electronic device.

13. The method of claim 12, further comprising:

detecting a package located in a lower portion of the image circle proximate to an edge of the image circle based on the final image; and providing an indication to a user of the electronic device that the package is present.

14. The method of claim 13, further comprising:

providing the final image to a storage memory; and outputting the final image to a user device based on a request for access to the storage memory.

15. The method of claim 12, wherein the image sensor optical axis is parallel to the lens optical axis.

16. The method of claim 12, wherein the portrait orientation and the vertical shift of the image sensor relative to the lens enables the image sensor to capture an area of the image circle corresponding to a vertical angle of view of the lens of approximately 130°.

17. The method of claim 12, wherein the image sensor is positioned to have a midpoint of a bottom edge of the sensor detection area located within the image circle.

18. The method of claim 12, wherein the image sensor is configured in a 3:4 portrait orientation.

19. The method of claim 12, wherein applying the keystone correction includes applying a trapezoidal shape to the captured image that is narrower at a top of the captured image corresponding to the upper corners located within the image circle and wider at a bottom of the captured image corresponding to the lower corners located outside of the image circle.

20. The method of claim 12, wherein the electronic doorbell includes a single image sensor, the single image sensor being the image sensor.

* * * * *